(12) United States Patent
Hama et al.

(10) Patent No.: US 11,761,169 B2
(45) Date of Patent: Sep. 19, 2023

(54) WORK MACHINE AND REMOTE OPERATION SUPPORT SYSTEM

(71) Applicant: KOBELCO CONSTRUCTION MACHINERY CO., LTD., Hiroshima (JP)

(72) Inventors: Ryota Hama, Hiroshima (JP); Yoichiro Yamazaki, Tokyo (JP); Ryuichi Hirose, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 31 days.

(21) Appl. No.: 17/566,098

(22) Filed: Dec. 30, 2021

(65) Prior Publication Data
US 2022/0220701 A1    Jul. 14, 2022

(30) Foreign Application Priority Data

Jan. 12, 2021    (JP) .................................. 2021-002569

(51) Int. Cl.
*E02F 9/20*    (2006.01)
*B60R 16/02*    (2006.01)

(52) U.S. Cl.
CPC ............ *E02F 9/2004* (2013.01); *B60R 16/02* (2013.01); *E02F 9/2066* (2013.01); *E02F 9/205* (2013.01)

(58) Field of Classification Search
CPC ....... E02F 9/2004; E02F 9/2066; E02F 9/205; E02F 9/207; E02F 9/2091; E02F 3/04; E02F 9/2095; B60R 16/02
See application file for complete search history.

(56) References Cited

U.S. PATENT DOCUMENTS

| 6,112,139 A | 8/2000 | Schubert et al. |
| 6,836,982 B1 | 1/2005 | Augustine |
| 2011/0175579 A1 | 7/2011 | Mazumdar |
| 2022/0042286 A1* | 2/2022 | Tsuji ....................... G06F 3/147 |

FOREIGN PATENT DOCUMENTS

| JP | H07-071281 A | 3/1995 |
| JP | H09-165789 A | 6/1997 |
| JP | 2020-039239 A | 3/2020 |
| WO | 2016/063058 A1 | 4/2018 |

OTHER PUBLICATIONS

Extended European search report dated Jun. 14, 2022 issued in corresponding EP Patent Application No. 22150976.3.

* cited by examiner

*Primary Examiner* — Jung Kim
(74) *Attorney, Agent, or Firm* — Carrier, Shende & Associates P.C.; Fulchand P. Shende; Joseph P. Carrier (57) ABSTRACT

Provided is a work machine or the like which can switch between a power supply state and a power supply cutoff state of an actual machine control device irrespective of switching on or off an actual machine switch. On switching an actual machine switch 81 from off to on, a first power supply route from an actual machine power source 80 to an actual machine control device 400 is formed. Consequently, a second power supply route from the actual machine power source 80 to the actual machine control device 400 is formed. Then, the first power supply route is cut off, while the second power supply route not through the actual machine switch 81 is maintained.

4 Claims, 8 Drawing Sheets

WORK MACHINE AND REMOTE OPERATION SUPPORT SYSTEM

BACKGROUND OF THE INVENTION

Field of the Invention

The present invention relates to a work machine such as a hydraulic excavator as a remote operation target.

Description of the Related Art

A technique of controlling an operation of a work machine such as a hydraulic excavator with an actual machine operation by an operator who boards the work machine in addition to a remote operation by a remote control device has been proposed (see, e.g., Japanese Patent Laid-Open No. 7-71281). The operator switches, to a remote control side or an actual machine control side, an actual machine switch configured to switch to the actual machine operation or the remote operation in the work machine, which makes it possible to control the operation of the work machine in response to the remote operation with the remote control device or the actual machine operation.

When an actual machine switch is switched to a remote control side, a work machine can be remotely operated by a remote control device, but when the remote operation of the work machine ends, the work machine waits for communication until the actual machine switch is switched from the remote control side to an actual machine control side. Consequently, energy such as electric power for communication is wasted.

To solve the problem, an object of the present invention is to provide a work machine or the like which can switch between a power supply state and a power supply cutoff state of an actual machine control device irrespective of switching on or off an actual machine switch.

SUMMARY OF THE INVENTION

A work machine of the present invention is a work machine which is controlled to be operated, based on communication with a remote operation apparatus, the work machine comprising:
an actual machine power source;
an actual machine switch which allows the work machine to be remotely operated by the remote operation apparatus;
an actual machine control device comprising a switch terminal, a power source terminal and a ground terminal, the actual machine control device having a function of switching the ground terminal to be grounded or non-grounded in response to a command from the remote operation apparatus;
a four-pin relay configured to cut off or connect between a pair of relay terminals in response to whether a pair of excitation terminals are energized; and
a five-pin relay configured to connect between a reference relay terminal and a first relay terminal or connect between the reference relay terminal and a second relay terminal, in response to whether a pair of excitation terminals are energized, wherein
the actual machine power source is
connected to the switch terminal of the actual machine control device through the actual machine switch,
connected to the power source terminal of the actual machine control device through the actual machine switch, and the reference relay terminal and the first relay terminal of the five-pin relay in order,
connected to the power source terminal of the actual machine control device through the pair of relay terminals of the four-pin relay and a forward first diode in order,
grounded through the pair of relay terminals of the four-pin relay, a forward second diode and the pair of excitation terminals of the five-pin relay in order,
connected to the ground terminal of the actual machine control device through the pair of excitation terminals of the four-pin relay, and
connected between the second diode and the five-pin relay through the actual machine switch, the reference relay terminal and the second relay terminal of the five-pin relay, and a forward third diode in order.

DETAILED DESCRIPTION OF THE PREFERRED EMBODIMENTS (Configuration of Remote Operation Support System)

Figure 1:
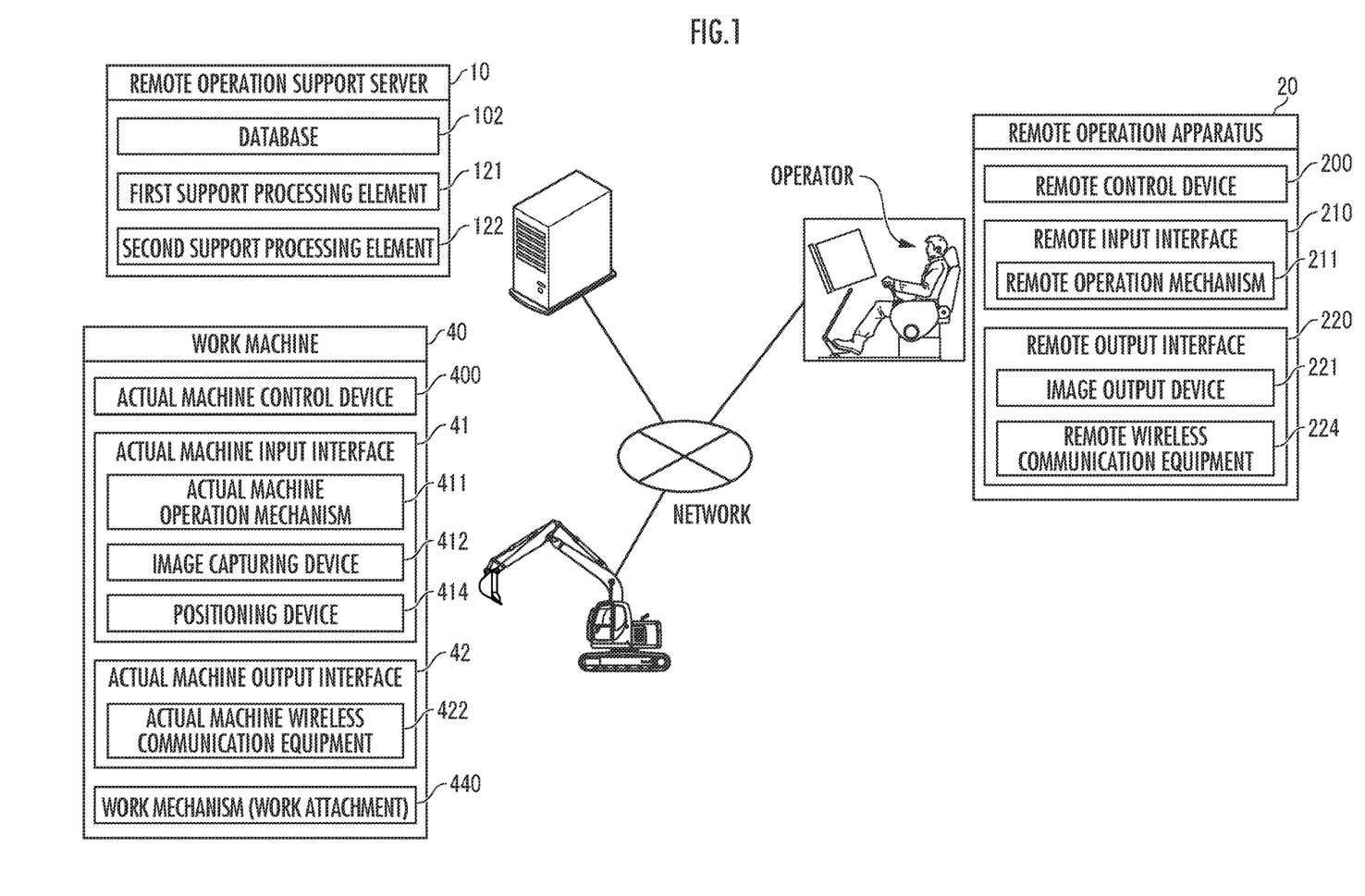
FIG. 1 is an explanatory view concerning a configuration of a remote operation support system as an embodiment of the present invention.

A remote operation support system as an embodiment of the present invention shown in FIG. 1 comprises a remote operation support server 10 and a work machine 40. The remote operation support system may be constituted of a remote operation apparatus 20 to remotely operate the work machine 40, in addition to the remote operation support server 10 and the work machine 40. The remote operation support server 10, the remote operation apparatus 20 and the work machine 40 are configured to communicate with one another via a network. A mutual communication network between the remote operation support server 10 and the remote operation apparatus 20 may be the same as or different from a mutual communication network between the remote operation support server 10 and the work machine 40.

To "recognize" information by constitutional elements of the present invention is a concept including any arithmetic processing for making the information available in subsequent arithmetic processing, such as receiving the information, reading the information from a storage device, searching the information from a database, measuring the information, determining, judging, presuming or predicting the information based on basic information received or obtained otherwise, and storing the information in the storage device.

(Configuration of Remote Operation Support Server)

The remote operation support server 10 comprises a database 102, a first support processing element 121, and a second support processing element 122. The database 102 stores and holds captured image data and the like. The database 102 may be constituted of a database server separate from the remote operation support server 10. Each support processing element is constituted of an arithmetic processing device (a single core processor or a multicore processor or a processor core included in the multicore processor), and reads required data and software from a storage device such as a memory, and executes after-mentioned arithmetic processing of the data as a target in accordance with the software.

(Configuration of Remote Operation Apparatus)

The remote operation apparatus 20 comprises a remote control device 200, a remote input interface 210, and a remote output interface 220. The remote control device 200 is constituted of an arithmetic processing device (a single core processor or a multicore processor or a processor core included in the multicore processor), and reads required data and software from a storage device such as a memory, and executes arithmetic processing of the data as a target in accordance with the software.

The remote input interface 210 comprises a remote operation mechanism 211. The remote output interface 220 comprises an image output device 221, an acoustic output device 222, and remote wireless communication equipment 224.

The remote operation mechanism 211 includes a running operation device, a pivoting operation device, a boom operation device, an arm operation device, and a bucket operation device. Each operation device includes an operation lever receiving a rotating operation. The operation lever (running lever) of the running operation device is operated to move a lower running body 410 of the work machine 40. The running lever may also serve as a running pedal. For example, a running pedal fixed to a base part or lower end of the running lever may be provided. The operation lever (pivot lever) of the pivot operation device is operated to move a hydraulic pivot motor included in a pivot mechanism 430 of the work machine 40. The operation lever (boom lever) of the boom operation device is operated to move a boom cylinder 442 of the work machine 40. The operation lever (arm lever) of the arm operation device is operated to move an arm cylinder 444 of the work machine 40. The operation lever (bucket lever) of the bucket operation device is operated to move a bucket cylinder 446 of the work machine 40.

Figure 2:
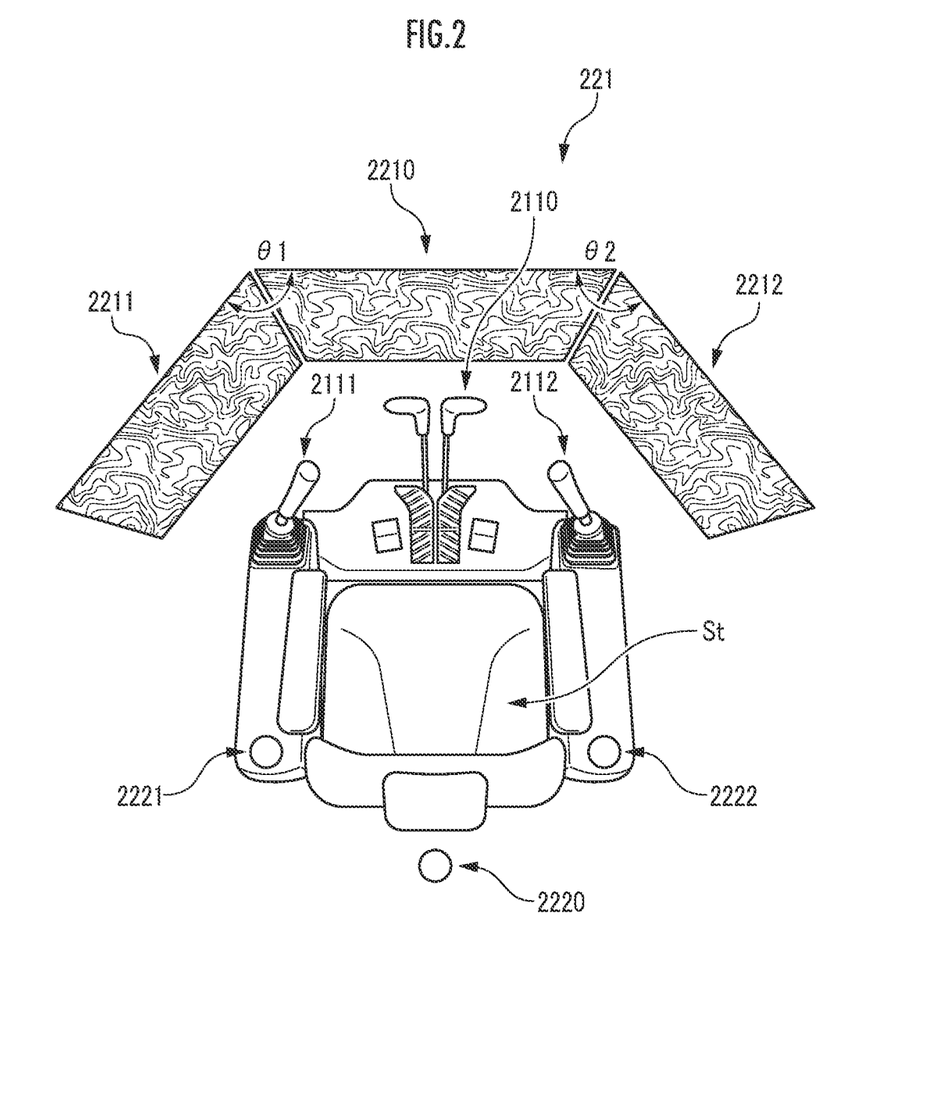
FIG. 2 is an explanatory view concerning a configuration of a remote operation apparatus.

The respective operation levers included in the remote operation mechanism 211 are arranged around a seat St on which an operator sits, for example, as shown in FIG. 2. The seat St has a form of a high back chair with arm rests, but may be a sitting part of any form on which the operator can sit, such as a form of a low back chair with no head rest, or a form of a chair with no back rest.

In front of the seat St, a pair of left and right running levers 2110 corresponding to left and right crawlers are arranged on left and right side by side. One operation lever may serve as a plurality of operation levers. For example, a left operation lever 2111 provided in front of a left frame of the seat St shown in FIG. 2 may function as the arm lever when operated in a front-rear direction, and function as the pivot lever when operated in a left-right direction. Similarly, a right operation lever 2112 provided in front of a right frame of the seat St shown in FIG. 2 may function as the boom lever when operated in the front-rear direction, and function as the bucket lever when operated in the left-right direction. The lever pattern may be arbitrarily changed in response to an operation instruction of the operator.

For example, as shown in FIG. 2, the image output device 221 is constituted of a central image output device 2210, a left image output device 2211 and a right image output device 2212 arranged forward, diagonally forward left and diagonally forward right of the seat St, each device having a substantially rectangular screen. The screen (image display region) of each of the central image output device 2210, the left image output device 2211 and the right image output device 2212 may have the same shape and size or different shapes and sizes.

As shown in FIG. 2, a right edge of the left image output device 2211 is adjacent to a left edge of the central image output device 2210 in such a manner that the screen of the central image output device 2210 and the screen of the left image output device 2211 form an inclination angle θ1 (e.g., 120°≤θ1≤150°). As shown in FIG. 2, a left edge of the right image output device 2212 is adjacent to a right edge of the central image output device 2210 in such a manner that the screen of the central image output device 2210 and the screen of the right image output device 2212 form an inclination angle θ2 (e.g., 120°≤θ2≤150°). The inclination angles θ1 and θ2 may be the same or different.

The respective screens of the central image output device 2210, the left image output device 2211 and the right image output device 2212 may be parallel to a vertical direction, or inclined to the vertical direction. At least one image output device of the central image output device 2210, the left image output device 2211 and the right image output device 2212 may be constituted of a plurality of divided image output devices. For example, the central image output device 2210 may be constituted of a pair of image output devices each including a substantially rectangular screen, the devices being adjacent to each other in an up-down direction.

The number of image output devices included in the image output device 221 may be arbitrarily changed. For example, the image output device 221 may be constituted of one image output device having a curved or bent surface to surround a front of the seat St. The image output device 221 may be constituted of four or more flat image output devices laterally continuously arranged to surround the front of the seat St.

The acoustic output device 222 is constituted of one or more speakers, and constituted of a central acoustic output device 2220, a left acoustic output device 2221 and a right acoustic output device 2222 arranged behind the seat St, respectively in a left arm rest rear part and a right arm rest rear part, for example, as shown in FIG. 2. The central acoustic output device 2220, the left acoustic output device 2221 and the right acoustic output device 2222 may have the same specification or different specifications.

(Configuration of Work Machine)

The work machine 40 comprises an actual machine control device 400, an actual machine input interface 41, an actual machine output interface 42, and a work mechanism 440. The actual machine control device 400 is constituted of an arithmetic processing device (a single core processor or a multicore processor or a processor core included in the multicore processor), and reads required data and software from a storage device such as a memory, and executes arithmetic processing of the data as a target in accordance with the software.

Figure 3:
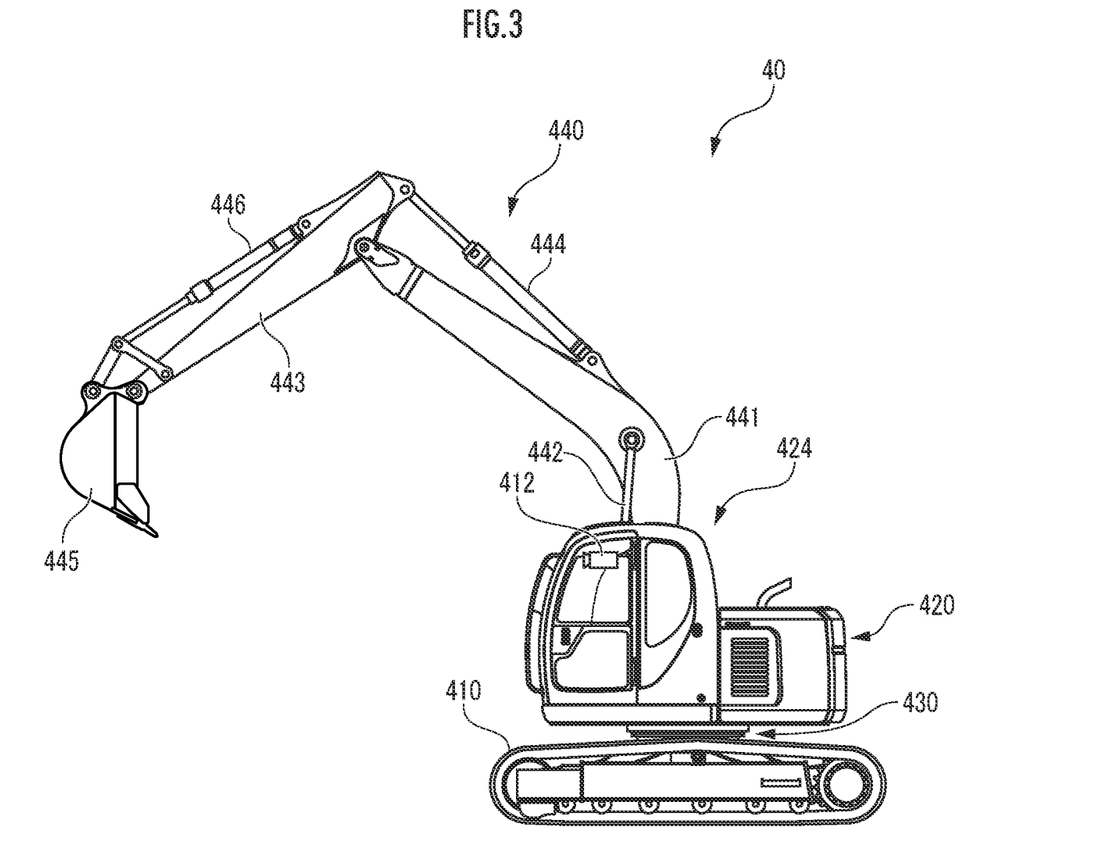
FIG. 3 is an explanatory view concerning a configuration of a work machine.

The work machine 40 is, for example, a crawler excavator (construction machine), and comprises a crawler type lower running body 410, and an upper pivot body 420 pivotally mounted on the lower running body 410 via the pivot mechanism 430, as shown in FIG. 3. The work machine 40 comprises an engine 460 as a drive source. The upper pivot body 420 has a front left part provided with a cab 424 (driver cab). The upper pivot body 420 has a front central part provided with the work mechanism 440.

The actual machine input interface 41 comprises an actual machine operation mechanism 411, an actual machine image capturing device 412, and a positioning device 414. The actual machine operation mechanism 411 comprises a plurality of operation levers arranged around a seat disposed in the cab 424 in the same manner as in the remote operation mechanism 211. A drive mechanism or a robot which receives a signal corresponding to an operation mode of a remote operation lever and moves an actual machine operation lever based on the received signal is provided in the cab 424. The actual machine image capturing device 412 is installed, for example, in the cab 424, and captures an image of an environment including at least a part of the work mechanism 440 through a front window and a pair of left and right side windows. The front window and side windows may be partially or entirely omitted. The positioning device 414 is constituted of a GPS, a gyro sensor and the like as required.

The actual machine output interface 42 comprises actual machine wireless communication equipment 422.

As shown in FIG. 3, the work mechanism 440 as a work mechanism comprises a boom 441 mounted to be raised and lowered on the upper pivot body 420, an arm 443 rotatably coupled to a tip of the boom 441, and a bucket 445 rotatably coupled to a tip of the arm 443. In the work mechanism 440, the boom cylinder 442, the arm cylinder 444 and the bucket cylinder 446 are mounted, each of which is constituted of an expandable and contractible hydraulic cylinder.

The boom cylinder 442 is interposed between the boom 441 and the upper pivot body 420 in such a manner that the boom cylinder receives supply of hydraulic oil and expands and contracts to rotate the boom 441 in a rising and lowering direction. The arm cylinder 444 is interposed between the arm 443 and the boom 441 in such a manner that the arm cylinder receives supply of hydraulic oil and expands and contracts to rotate the arm 443 relative to the boom 441 around a horizontal axis. The bucket cylinder 446 is interposed between the bucket 445 and the arm 443 in such a manner that the bucket cylinder receives supply of hydraulic oil and expands and contracts to rotate the bucket 445 relative to the arm 443 around the horizontal axis.

Figure 4:
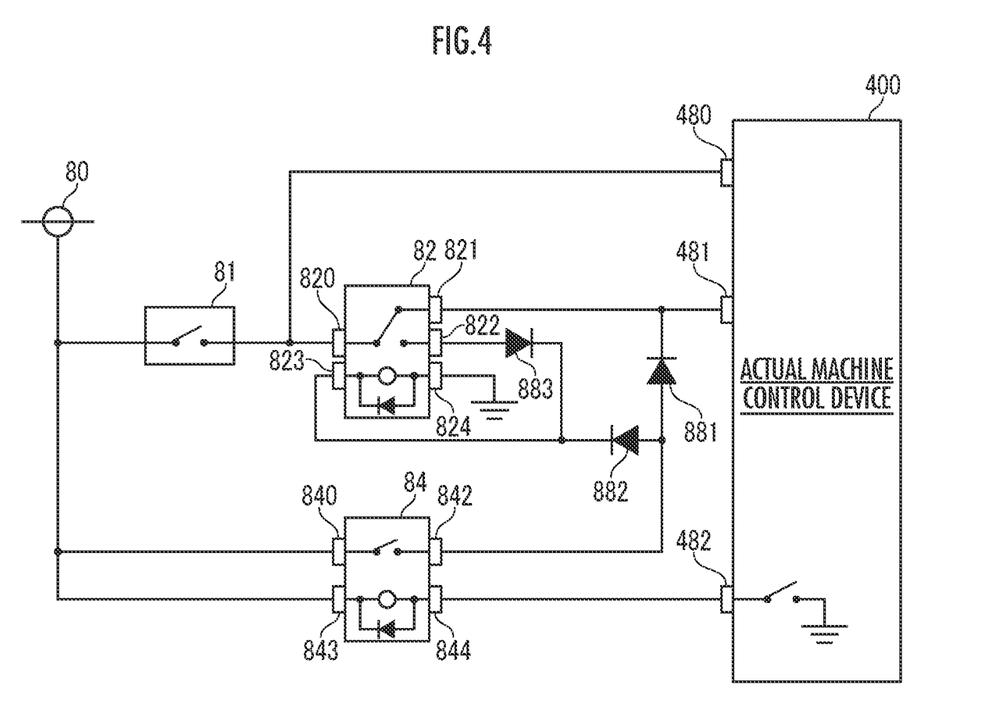
FIG. 4 is an explanatory view concerning a configuration of a power control device in the work machine.

As shown in FIG. 4, the work machine 40 comprises an actual machine power source 80, an actual machine switch 81, a five-pin relay 82, and a four-pin relay 84.

The actual machine power source 80 is constituted of, for example, a secondary battery such as a lithium ion battery and/or a fuel battery and/or a capacitor.

The actual machine switch 81 is a switch that makes it possible to remotely operate the work machine 40 with the remote operation apparatus 20. The actual machine switch 81 is provided, for example, in the cab 424.

As shown in FIG. 4, the actual machine control device 400 comprises a switch terminal 480, a power source terminal 481 and a ground terminal 482. The actual machine control device 400 has a function of switching the ground terminal 482 to be grounded or non-grounded in response to a command from the remote operation apparatus 20.

As shown in FIG. 4, the five-pin relay 82 is configured in such a manner that in a case where a pair of excitation terminals 823 and 824 are not energized, a reference relay terminal 820 and a first relay terminal 821 are connected, and in a case where the pair of excitation terminals 823 and 824 are energized, the reference relay terminal 820 and a second relay terminal 822 are connected. In the pair of excitation terminals 823 and 824, one excitation terminal 824 on a downstream side seen from the actual machine power source 80 is grounded.

As shown in FIG. 4, the four-pin relay 84 is configured in such a manner that in a case where a pair of excitation terminals 843 and 844 are not energized, a pair of relay terminals 840 and 842 are cut off, and in a case where the pair of excitation terminals 843 and 844 are energized, the pair of relay terminals 840 and 842 are connected.

As shown in FIG. 4, the actual machine power source 80 is connected to the switch terminal 480 of the actual machine control device 400 through the actual machine switch 81. The actual machine power source 80 is connected to the power source terminal 481 of the actual machine control device 400 through the actual machine switch 81, and the reference relay terminal 820 and the first relay terminal 821 of the five-pin relay 82 in order. The actual machine power source 80 is connected to the power source terminal 481 of the actual machine control device 400 through the pair of relay terminals 840 and 842 of the four-pin relay 84 and a forward first diode 881 in order. The actual machine power source 80 is connected to the excitation terminal 823 on an upstream side seen from the actual machine power source 80 in the pair of excitation terminals 823 and 824 of the five-pin relay 82 through the pair of relay terminals of the four-pin relay 84, and a forward second diode 882 in order. The actual machine power source 80 is connected to the ground terminal 482 of the actual machine control device 400 through the pair of excitation terminals 843 and 844 of the four-pin relay 84. The actual machine power source 80 is connected between the second diode 882 and the upstream-side excitation terminal 823 of the five-pin relay 82 through the actual machine switch 81, the reference relay terminal 820 and the second relay terminal 822 of the five-pin relay 82, and a forward third diode 883 in order.

(Function of Remote Operation Support System)

Figure 5:
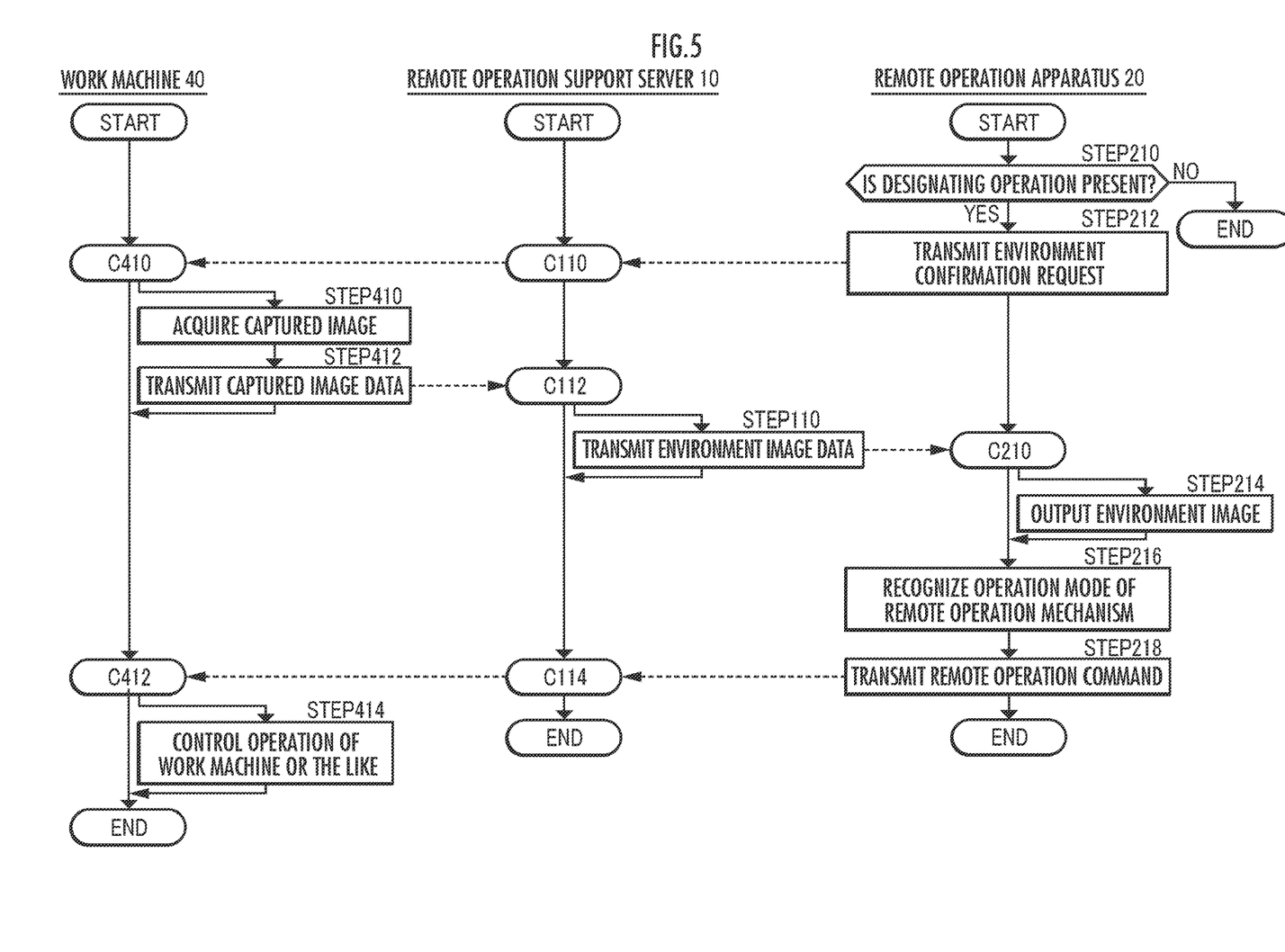
FIG. 5 is an explanatory view concerning a basic function of the operation support system.

FIG. 5 is a flowchart explaining a basic function of the remote operation support system with the above configuration. In the flowchart, each block denoted with a reference sign starting with "C" is used for simplicity of description, and the block has a meaning of transmission and/or reception of data and a meaning of conditional branch to execute processing in a branch direction on a condition of the transmission and/or reception of the data. The received data is stored in the storage device constituted of the database 102 and/or a nonvolatile or volatile memory.

In the remote operation apparatus 20, it is determined whether a designating operation through the remote input interface 210 by the operator is present (FIG. 5/STEP210). "The designating operation" is, for example, a tapping operation in the remote input interface 210 to designate the work machine 40 intended to be remotely operated by the operator. If the determination result is negative (FIG. 5/NO in STEP210), a series of processing ends. On the other hand, if the determination result is positive (FIG. 5/YES in STEP210), an environment confirmation request is transmitted to the remote operation support server 10 through the remote wireless communication equipment 224 (FIG. 5/STEP212).

In the remote operation support server 10, in a case where the environment confirmation request is received, the first support processing element 121 transmits the environment confirmation request to the corresponding work machine 40 (FIG. 5/C110).

In the work machine 40, in a case where the environment confirmation request is received through the actual machine wireless communication equipment 422 (FIG. 5/C410), the actual machine control device 400 acquires a captured image through the actual machine image capturing device 412 (FIG. 5/STEP410). Here, image processing may be executed by the actual machine control device 400 or an image processing device included in this actual machine control device. Captured image data subjected to the image processing is transmitted to the remote operation support server 10 through the actual machine wireless communication equipment 422 by the actual machine control device 400 (FIG. 5/STEP412).

In the remote operation support server 10, in a case where the captured image data is received by the first support processing element 121 (FIG. 5/C112), environment image data corresponding to the captured image is transmitted to the remote operation apparatus 20 by the second support processing element 122 (FIG. 5/STEP110). The environment image data is captured image data itself, and is additionally image data representing a simulated environment image generated based on the captured image. In a case where an image processing device 30 is constituted of the remote operation support server 10, the environment image data may be generated by subjecting the captured image data to image processing by the image processing device 30.

In the remote operation apparatus 20, in a case where the environment image data is received through the remote wireless communication equipment 224 (FIG. 5/C210), an environment image corresponding to the environment image data is outputted to the image output device 221 by the remote control device 200 (FIG. 5/STEP214).

Figure 6:
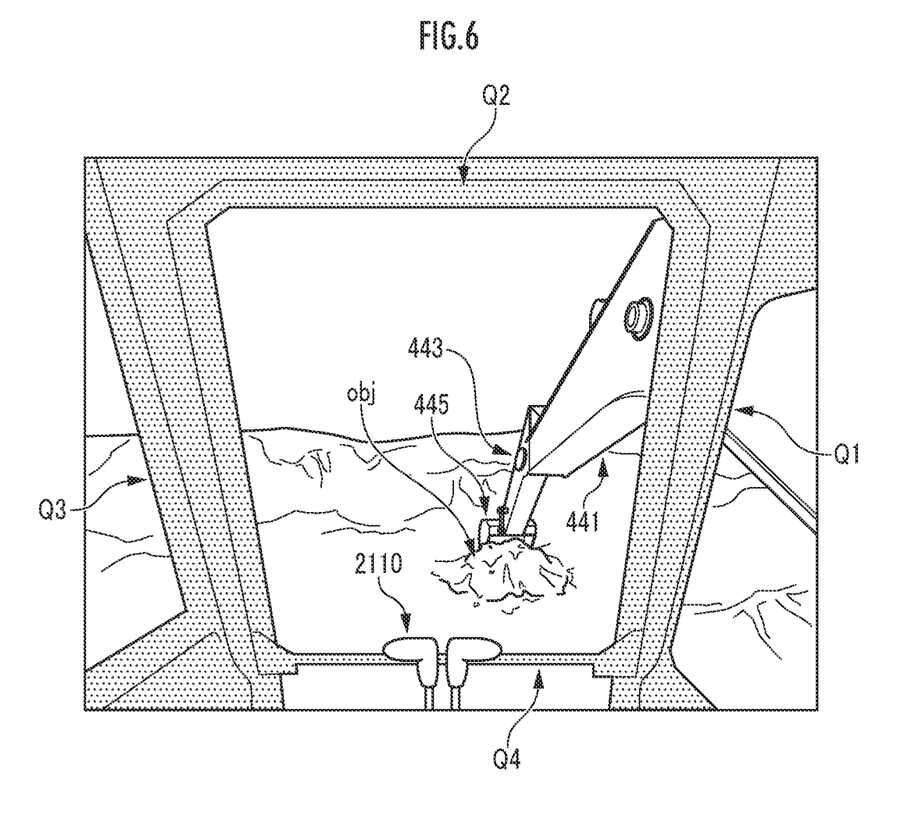
FIG. 6 is an explanatory view concerning a work environment image.

Consequently, for example, as shown in FIG. 6, in the environment image outputted to the image output device 221, the boom 441 and the arm 443 which are parts of the work mechanism 440 and a pile of rubble or earth and sand (object of a work by the bucket 445) are reflected in front of the cab 424 through a window frame constituted of a right window frame Q1, an upper window frame Q2, a left window frame Q3 and a lower window frame Q4 which define the cab 424. The environment image may be generated in such a manner that at least parts of the window frames Q1 to Q4 are not reflected, by image processing of the captured image or by view angle adjustment of the actual machine image capturing device 412. In a case where the actual machine image capturing device 412 is not provided in the cab 424 but is provided outside, a captured image in which constituent components of the cab 424, such as the window frames Q1 to Q4, are not reflected, eventually the environment image can be acquired.

In the remote operation apparatus 20, the remote control device 200 recognizes an operation mode of the remote operation mechanism 211 (FIG. 5/STEP216), and a remote operation command corresponding to the operation mode is transmitted to the remote operation support server 10 through the remote wireless communication equipment 224 (FIG. 5/STEP218).

In the remote operation support server 10, in a case where the remote operation command is received by the second support processing element 122, the remote operation command is transmitted to the work machine 40 by the first support processing element 121 (FIG. 5/C114).

In the work machine 40, in a case where an operation command is received by the actual machine control device 400 through the actual machine wireless communication equipment 422 (FIG. 5/C412), an operation of the work mechanism 440 or the like is controlled (FIG. 5/STEP414).

For example, a work of scooping soil in front of the work machine 40 with the bucket 445, pivoting the upper pivot body 420 and dropping the soil from the bucket 445 is executed.

Figure 7:
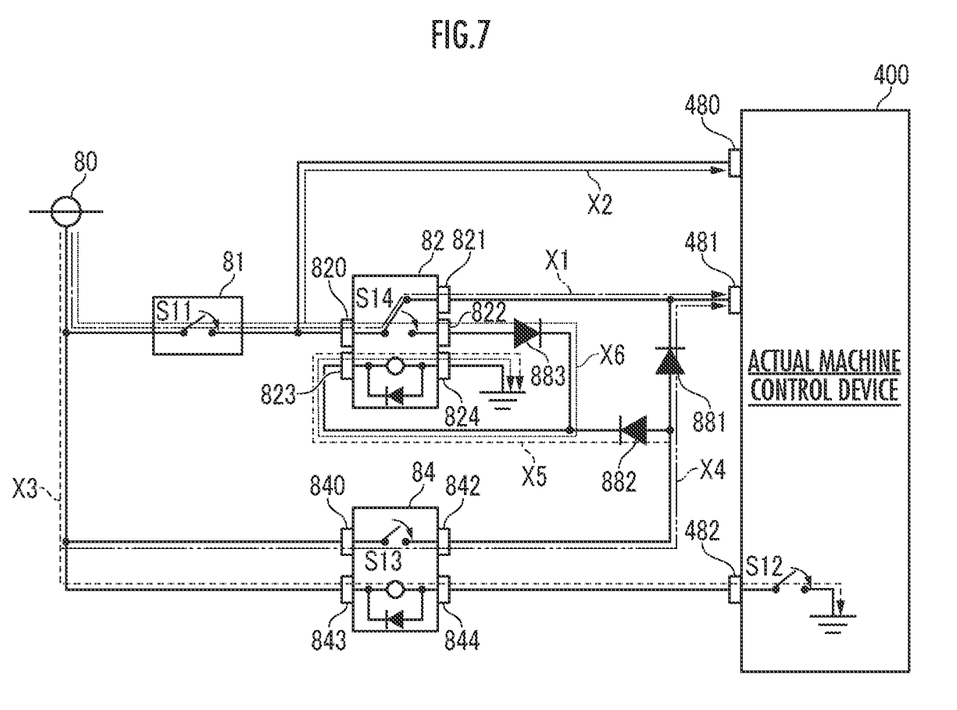
FIG. 7 is an explanatory view concerning a power supply start procedure of the power control device.

(Function of Work Machine) According to the work machine 40 with the above configuration, in an initial state, as shown in FIG. 4, the actual machine switch 81 is off, the reference relay terminal 820 and the first relay terminal 821 of the five-pin relay 82 are connected, and the pair of relay terminals 840 and 842 of the four-pin relay 84 are not connected. Here, as shown in FIG. 7, on switching the actual machine switch 81 from off to on (see FIG. 7/an arc arrow S11), a first power supply route to the actual machine control device 400 is formed from the actual machine power source 80 through the actual machine switch 81 in an on-state, the reference relay terminal 820 and the first relay terminal 821 of the five-pin relay 82, and the power source terminal 481 in order (see FIG. 7/a dashed chain line arrow X1). Consequently, the actual machine control device 400 transits from a power supply cutoff state to a power supply state.

Afterward, when electric power is supplied from the actual machine power source 80 through the actual machine switch 81 in the on-state and the switch terminal 480, the actual machine control device 400 detects that the actual machine switch 81 is switched from off to on (see FIG. 7/a solid line arrow X2). According to the detection result, in the actual machine control device 400, the ground terminal 482 is switched from a non-grounded state to a grounded state (see FIG. 7/an arc arrow S12).

As a result, current flows from the actual machine power source 80 across the pair of excitation terminals 843 and 844 of the four-pin relay 84 (see FIG. 7/a dashed arrow X3), and in response to this, the pair of relay terminals 840 and 842 of the four-pin relay 84 are switched from a non-connected state to a connected state (see FIG. 7/an arc arrow S13). Consequently, a second power supply route to the actual machine control device 400 is formed from the actual machine power source 80 through the pair of relay terminals 840 and 842 of the four-pin relay 84, the forward first diode 881 and the power source terminal 481 in order (see FIG. 7/a double-dashed chain line arrow X4).

Also, current flows between the pair of excitation terminals 823 and 824 of the five-pin relay 82 from the actual machine power source 80 through the pair of relay terminals 840 and 842 of the four-pin relay 84 and the forward second diode 882 (see FIG. 7/a dashed arrow X5), and in response to this, a connection destination of the reference relay terminal 820 of the five-pin relay 82 is switched from the first relay terminal 821 to the second relay terminal 822 (see FIG. 7/an arc arrow S14). Consequently, current flows from the second relay terminal 822 of the five-pin relay 82 via the third diode 883 through the pair of excitation terminals 823 and 824 of the five-pin relay 82, and the five-pin relay 82 is in a self-excitation state (see FIG. 7/a dotted arrow X6).

Further, the first power supply route (see FIG. 7/the dashed chain line arrow X1) is cut off, while the second power supply route not through the actual machine switch 81 (see FIG. 7/the double-dashed chain line arrow X4) is maintained.

Consequently, the actual machine control device 400 has a power-on state maintained as it is. Then, switching of the actual machine control device 400 to the power-on state and a power-off state is controlled only by the actual machine control device 400 itself.

Figure 8:
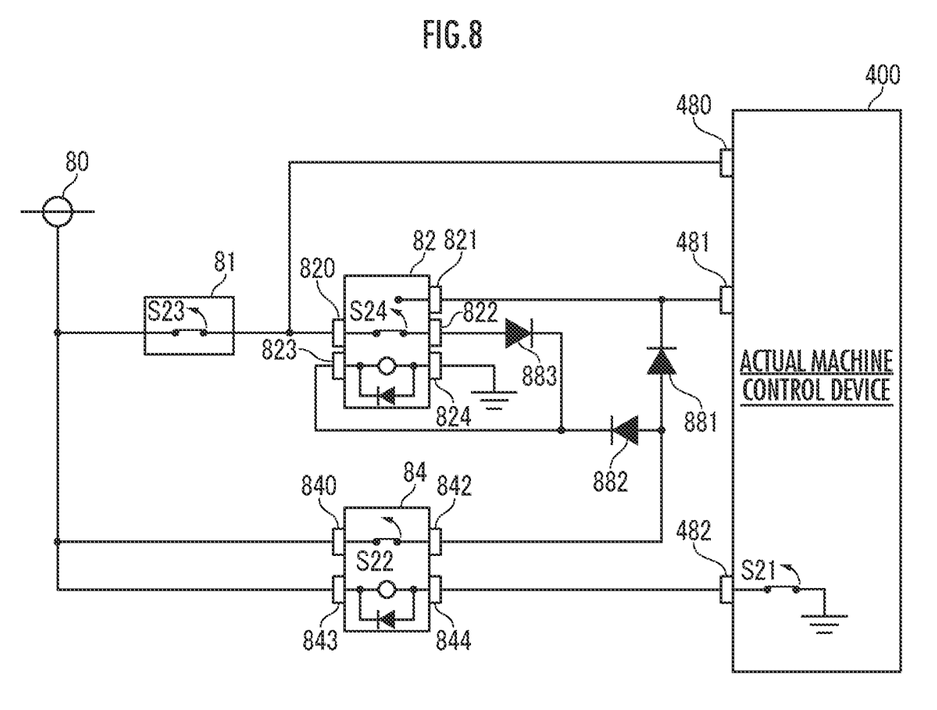
FIG. 8 is an explanatory view concerning a power supply stop procedure of the power control device.

Specifically, in a case where the remote operation apparatus 20 sends a power-off command to the actual machine control device 400, as shown in FIG. 8, the ground terminal 482 is switched from a grounded state to a non-grounded state by the actual machine control device 400 (see FIG. 8/an arc arrow S21).

In response to this switching, the current from the actual machine power source 80 across the pair of excitation terminals 843 and 844 of the four-pin relay 84 (see FIG. 7/the dashed arrow X3) does not flow, and the pair of relay terminals 840 and 842 of the four-pin relay 84 are switched from the connected state to the non-connected state (see FIG. 8/an arc arrow S22). Consequently, the second power supply route to the actual machine control device 400 from the actual machine power source 80 through the pair of relay terminals 840 and 842 of the four-pin relay 84 and the forward first diode 881 in order (see FIG. 7/the double-dashed chain line arrow X4) is cut off, and the actual machine control device 400 is switched from power-on to power-off. Also, the current between the pair of excitation terminals 823 and 824 of the five-pin relay 82 from the actual machine power source 80 through the pair of relay terminals 840 and 842 of the four-pin relay 84 and the forward second diode 882 (see FIG. 7/the dashed arrow X5) does not flow.

In the remote operation support system with the above configuration, when the remote operation of the work machine 40 by the remote operation apparatus 20 ends, the power-off command is issued from the remote operation apparatus 20 to the actual machine control device 400. The power-off command may be manually issued by the operator, or may be automatically issued.

For example, when the remote operation of the work machine 40 by the remote operation apparatus 20 ends, the power-off command may be issued by receiving, in the remote input interface 210, an operation to issue the power-off command by the operator.

Alternatively, for example, when determining that a predetermined work is ended by the remote operation of the work machine 40 by the remote operation apparatus 20, the power-off command may be issued, or when determining that the remote operation mechanism 211 is not operated continuously for a predetermined time, the power-off command may be issued.

Consequently, in conjunction with the end of the remote operation of the work machine 40 by the remote operation apparatus 20, the power-off command is issued to the actual machine control device 400, and the second power supply route to the actual machine control device 400 is cut off.

Afterward, in a case where the actual machine switch 81 is switched from on to off (see FIG. 8/an arc arrow S23), the current from the actual machine power source 80 across the pair of excitation terminals 823 and 824 of the five-pin relay 82 (see FIG. 7/the dotted arrow X6) does not flow, and in response to this, the connection destination of the reference relay terminal 820 of the five-pin relay 82 is switched from the second relay terminal 822 to the first relay terminal 821 (see FIG. 8/an arc arrow S24). As a result, the work machine 40 returns to such an initial state as shown in FIG. 7.

On returning to the initial state, the second power supply route to the actual machine control device 400 (see FIG. 7/the double-dashed chain line arrow X4) is formed by switching the actual machine switch 81 from off to on again (see FIG. 7/the arc arrow S11).

In the present embodiment, the ground terminal 482 is switched from the grounded state to the non-grounded state by the actual machine control device 400, then the pair of relay terminals 840 and 842 of the four-pin relay 84 are switched from the connected state to the non-connected state, then the actual machine switch 81 is switched from on to off, and the connection destination of the reference relay terminal 820 of the five-pin relay 82 is switched from the second relay terminal 822 to the first relay terminal 821 (see FIG. 8/the arc arrows S21, S22, S23 and S24 in order), but this switching order may be varied.

For example, first, in the case where the actual machine switch 81 is switched from on to off (see FIG. 8/the arc arrow S23), the electric power from the actual machine power source 80 through the switch terminal 480 (see FIG. 7/the solid line arrow X2) is not supplied, the actual machine control device 400 detects that the actual machine switch 81 is switched from on to off. According to the detection result, the actual machine control device 400 switches the ground terminal 482 from the grounded state to the non-grounded state (see FIG. 8/the arc arrow S21). In response to this switching, the current from the actual machine power source 80 across the pair of excitation terminals 843 and 844 of the four-pin relay 84 (see FIG. 7/the dashed arrow X3) does not flow, and the pair of relay terminals 840 and 842 of the four-pin relay 84 are switched from the connected state to the non-connected state (see FIG. 8/the arc arrow S22). Consequently, the second power supply route to the actual machine control device 400 from the actual machine power source 80 through the pair of relay terminals 840 and 842 of the four-pin relay 84 and the forward first diode 881 in order (see FIG. 7/the double-dashed chain line arrow X4) is cut off, and the actual machine control device 400 is switched from power-on to power-off. Also, the current between the pair of excitation terminals 823 and 824 of the five-pin relay 82 from the actual machine power source 80 through the pair of relay terminals 840 and 842 of the four-pin relay 84 and the forward second diode 882 (see FIG. 7/the dashed arrow X5) does not flow.

Then, in response to no flow of the current (see FIG. 7/the dotted arrow X6) from the actual machine power source 80 across the pair of excitation terminals 823 and 824 of the five-pin relay 82, the connection destination of the reference relay terminal 820 of the five-pin relay 82 is switched from the second relay terminal 822 to the first relay terminal 821 (see FIG. 8/the arc arrow S24). As a result, the work machine 40 returns to the initial state.

Specifically, in response to the switching of the actual machine switch 81 from on to off, the actual machine control device 400 switches the ground terminal 482 from the grounded state to the non-grounded state, then the pair of relay terminals 840 and 842 of the four-pin relay 84 are switched from the connected state to the non-connected state, and then the connection destination of the reference relay terminal 820 of the five-pin relay 82 is switched from the second relay terminal 822 to the first relay terminal 821 (see FIG. 8/the arc arrows S23, S21, S22 and S24 in order). Therefore, both the first power supply route (see FIG. 7/the dashed chain line arrow X1) and the second power supply route (see FIG. 7/the double-dashed chain line arrow X4) are cut off.

(Effects)

Therefore, once the actual machine switch 81 is switched from off to on, the switching between the power-on state and the power-off state of the actual machine control device 400 is controlled by the actual machine control device 400 itself, and the work machine 40 does not wait for communication after the end of the remote operation.

Specifically, the second power supply route to the actual machine control device 400 is cut off immediately after the end of the remote operation of the work machine 40 by the remote operation apparatus 20, and hence energy such as electric power for communication is not wasted.

Consequently, the power supply route to the actual machine control device 400 can be cut off, without the operator visiting the work machine 40 to turn the actual machine switch 81 from on to off.

To remotely operate the work machine 40 again after the power supply route to the actual machine control device 400 is cut off, it is necessary for the operator to visit the work machine 40 and switch the actual machine switch 81 from on to off. However, it is necessary for the operator to visit the work machine 40 and inspect the work machine 40 before remotely operating the work machine 40, and a switching work of the actual machine switch 81 may be included in this inspection work and performed, which does not add to the operator burden.

Also, even in a case where the operator visits the work machine 40 to turn off the actual machine switch 81, both the first power supply route (see FIG. 7/the dashed chain line arrow X1) and the second power supply route (see FIG. 7/the double-dashed chain line arrow X4) are cut off in response to the switching of the actual machine switch 81 from on to off.

Another Embodiment of Present Invention

At least part of functional elements of the remote operation support server 10 may be constituted of the remote operation apparatus 20 and/or the work machine 40. For example, the first support processing element 121 may be constituted of the remote control device 200 and/or the actual machine control device 400 as a first arithmetic processing device. The second support processing element 122 may be constituted of the remote control device 200 and/or the actual machine control device 400 as a second arithmetic processing device. In a case where the functional element of the remote operation support server 10 is mounted in the remote operation apparatus 20, information may be communicated by wired communication through wired network mounted in the remote operation apparatus 20 in place of the wireless communication in the above embodiment. Similarly, in a case where the functional element of the remote operation support server 10 is mounted in the work machine 40, information may be communicated by wired communication through wired network mounted in the work machine 40 in place of the wireless communication in the above embodiment.

Depending on the on/off state of the actual machine switch 81, operation control of the work machine 40 in response to the remote operation by use of the remote operation mechanism 211 by an operator in the remote operation apparatus 20, or operation control of the work machine 40 in response to an actual machine operation by use of the actual machine operation mechanism 411 by an operator in the work machine 40 may be selectively switched. For example, in a case where the actual machine switch 81 is switched on, the operation control of the work machine 40 in response to the remote operation by use of the remote operation mechanism 211 is made effective, and in a case where the actual machine switch 81 is switched off, the operation control of the work machine 40 in response to the remote operation by use of the remote operation mechanism 211 is made ineffective. Consequently, when the operator who boards the work machine 40 operates the actual machine, the operation of the work machine 40 can be prevented from being influenced or interfered from the remote operation, by switching off the actual machine switch 81.

The actual machine control device 400 may control the operation of the engine 460 depending on each of an operation command and an operation prohibiting command for the engine 460 as commands from the remote operation apparatus 20. Consequently, the actual machine control device 400 may stop only the engine 460, for example, in a state where the ground terminal 482 is maintained in the grounded state, or may switch the ground terminal 482 to the non-grounded state and further stop the engine 460.

For example, the remote operation of the work machine 40 by the remote operation apparatus 20 may be interrupted. In this case, if the first power supply route (see FIG. 7/the dashed chain line arrow X1) and the second power supply route (see FIG. 7/the double-dashed chain line arrow X4) to the actual machine control device 400 are cut off, for returning the work machine 40 to the initial state shown in FIG. 7, the operator needs to visit the work machine 40 to switch the actual machine switch 81 from on to off, so that the remote operation of the work machine 40 by the remote operation apparatus 20 cannot be restarted quickly. Therefore, in a case where the remote operation of the work machine 40 by the remote operation apparatus 20 is interrupted, the operation prohibiting command for the engine 460 is sent as the command from the remote operation apparatus 20 to temporarily stop the operation of the engine 460, so that fuel can be prevented from being wasted. Also, in a case where the remote operation of the work machine 40 by the remote operation apparatus 20 is resumed, the operation command for the engine 460 is sent as the command from the remote operation apparatus 20 to start the engine 460 again, so that the remote operation of the work machine 40 by the remote operation apparatus 20 can be quickly restarted without the operator visiting the work machine 40.

Also, at the end of the remote operation of the work machine 40 by the remote operation apparatus 20, the first power supply route (see FIG. 7/the dashed chain line arrow X1) and the second power supply route (see FIG. 7/the double-dashed chain line arrow X4) to the actual machine control device 400 are cut off, and hence the work machine 40 is not operated. Consequently, at the end of the remote operation of the work machine 40 by the remote operation apparatus 20, the operation of the engine 460 can be stopped by automatically sending the operation prohibiting command for the engine 460 as the command from the remote operation apparatus 20.

REFERENCE SIGNS LIST

10 remote operation support server
20 remote operation apparatus
40 work machine
41 actual machine input interface
42 actual machine output interface
80 actual machine power source
81 actual machine switch
82 five-pin relay
84 four-pin relay
102 database
121 first support processing element
122 second support processing element
200 remote control device
210 remote input interface
211 remote operation mechanism
220 remote output interface
221 image output device
222 acoustic output device
224 remote wireless communication equipment 400 actual machine control device
424 cab (driver cab)
440 work mechanism
445 bucket (work unit)
460 engine
480 switch terminal
481 power source terminal
482 ground terminal
820 reference relay terminal
821 first relay terminal
822 second relay terminal
823 upstream-side excitation terminal
824 downstream-side excitation terminal
840 upstream-side relay terminal
842 downstream-side relay terminal
843 upstream-side excitation terminal
844 downstream-side excitation terminal
881 first diode
882 second diode
883 third diode
FIG. 1
10 REMOTE OPERATION SUPPORT SERVER
102 DATABASE
121 FIRST SUPPORT PROCESSING ELEMENT
122 SECOND SUPPORT PROCESSING ELEMENT
40 WORK MACHINE
400 ACTUAL MACHINE CONTROL DEVICE
41 ACTUAL MACHINE INPUT INTERFACE
411 ACTUAL MACHINE OPERATION MECHANISM
412 IMAGE CAPTURING DEVICE
414 POSITIONING DEVICE
42 ACTUAL MACHINE OUTPUT INTERFACE
422 ACTUAL MACHINE WIRELESS COMMUNICATION EQUIPMENT
440 WORK MECHANISM (WORK ATTACHMENT)
1 OPERATOR
2 NETWORK
20 REMOTE OPERATION APPARATUS
200 REMOTE CONTROL DEVICE
210 REMOTE INPUT INTERFACE
211 REMOTE OPERATION MECHANISM
220 REMOTE OUTPUT INTERFACE
221 IMAGE OUTPUT DEVICE
224 REMOTE WIRELESS COMMUNICATION EQUIPMENT
FIG. 4
400 ACTUAL MACHINE CONTROL DEVICE
FIG. 5
40 WORK MACHINE
STEP410 ACQUIRE CAPTURED IMAGE
STEP412 TRANSMIT CAPTURED IMAGE DATA
STEP414 CONTROL OPERATION OF WORK MACHINE OR THE LIKE
10 REMOTE OPERATION SUPPORT SERVER
STEP110 TRANSMIT ENVIRONMENT IMAGE DATA
20 REMOTE OPERATION APPARATUS
STEP210 IS DESIGNATING OPERATION PRESENT?
STEP212 TRANSMIT ENVIRONMENT CONFIRMATION REQUEST
STEP214 OUTPUT ENVIRONMENT IMAGE
STEP216 RECOGNIZE OPERATION MODE OF REMOTE OPERATION MECHANISM
STEP218 TRANSMIT REMOTE OPERATION COMMAND
FIG. 7
400 ACTUAL MACHINE CONTROL DEVICE
FIG. 8
400 ACTUAL MACHINE CONTROL DEVICE

What is claimed is:

1. A work machine which is controlled to be operated, based on communication with a remote operation apparatus, the work machine comprising:
an actual machine power source;
an actual machine switch which allows the work machine to be remotely operated by the remote operation apparatus;
an actual machine control device comprising a switch terminal, a power source terminal and a ground terminal, the actual machine control device having a function of switching the ground terminal to be grounded or non-grounded in response to a command from the remote operation apparatus;
a four-pin relay configured to cut off or connect between a pair of relay terminals in response to whether a pair of excitation terminals are energized; and
a five-pin relay configured to connect between a reference relay terminal and a first relay terminal or connect between the reference relay terminal and a second relay terminal, in response to whether a pair of excitation terminals are energized, wherein
the actual machine power source is
connected to the switch terminal of the actual machine control device through the actual machine switch,
connected to the power source terminal of the actual machine control device through the actual machine switch, and the reference relay terminal and the first relay terminal of the five-pin relay in order,
connected to the power source terminal of the actual machine control device through the pair of relay terminals of the four-pin relay and a forward first diode in order,
grounded through the pair of relay terminals of the four-pin relay, a forward second diode and the pair of excitation terminals of the five-pin relay in order,
connected to the ground terminal of the actual machine control device through the pair of excitation terminals of the four-pin relay, and
connected between the second diode and the five-pin relay through the actual machine switch, the reference relay terminal and the second relay terminal of the five-pin relay, and a forward third diode in order.

2. The work machine according to claim 1, wherein the actual machine switch is configured to selectively switch between operation control of the work machine in response to a remote operation by an operator in the remote operation apparatus, and operation control of the work machine in response to an actual machine operation by an operator in the work machine.

3. The work machine according to claim 1, wherein the actual machine control device controls an operation of an engine which is a drive source of the work machine, in response to each of an operation command and an operation prohibiting command for the engine, which are the command from the remote operation apparatus.

4. A remote operation support system comprising:
the work machine according to claim 1; and
a remote operation apparatus having a mutual communication function with the work machine.

* * * * *